United States Patent [19]

Atwood

[11] Patent Number: 5,036,455
[45] Date of Patent: Jul. 30, 1991

[54] MULTIPLE POWER SUPPLY SENSOR FOR PROTECTING SHARED PROCESSOR BUSES

[75] Inventor: John G. Atwood, San Jose, Calif.

[73] Assignee: Tandem Computers Incorporated, Cupertino, Calif.

[21] Appl. No.: 385,330

[22] Filed: Jul. 25, 1989

[51] Int. Cl.⁵ .............................................. G06F 11/30
[52] U.S. Cl. ................................. 364/200; 364/273.4; 371/66
[58] Field of Search ..................... 364/273.4, 948.5; 371/66

[56] References Cited

U.S. PATENT DOCUMENTS

| | | | |
|---|---|---|---|
| 4,016,408 | 4/1977 | Kaetzle | 371/66 X |
| 4,228,496 | 10/1980 | Katzman et al. | 371/66 X |
| 4,639,864 | 1/1987 | Katzman et al. | 371/66 X |

*Primary Examiner*—Stephen M. Baker
*Attorney, Agent, or Firm*—Townsend and Townsend

[57] ABSTRACT

A multiple power supply sensor for protecting shared processor buses in a multiprocessor system. In the case that a power failure or power supply malfunction occurs in one of the processors of the system, at least one of the shared processor buses will be isolated from the malfunctioning processor. As a result, data on that bus is not corrupted by the manfunctioning processor. The isolation is accomplished by independent sensor circuits present in each processor for each bus.

3 Claims, 4 Drawing Sheets

MULTIPLE POWER SUPPLY SENSOR FOR PROTECTING SHARED PROCESSOR BUSES

BACKGROUND OF THE INVENTION

The present invention relates generally to protecting a multiprocessor system from total failure in the case that one processor malfunctions. More particularly, the invention is directed to isolating a malfunctioning processor from the multiprocessor system.

Multiprocessor systems often include more than one interprocessor bus through which the different processors communicate with each other. At least one bus must always be functional for the system to operate properly. If a processor loses power or its power supply malfunctions, its power supplies begin to produce voltages which are not within specification limits. As a result, other malfunctions can occur in a processor. These malfunctions can result in a malfunctioning processor triggering further malfunctions throughout the system. Therefore, the malfunctioning processor must be isolated or "fenced off" from the rest of the system using a fencing circuit.

U.S. Pat. No. 4,356,550 shows a system using a single power supply sensor circuit, capable of operation even after the power supply voltages had dropped. This system was used to provide signals to each of the fencing circuits indicating that the fences should be "raised" so as to isolate the malfunctioning processor from the interprocessor buses.

SUMMARY OF THE INVENTION

The present invention provides a multiple power supply sensor for protecting shared processor buses. In the case of a power failure, a multiprocessor system is able to continue functioning by passing signals over at least one processor bus which is unaffected by the power failure. One advantage of the present invention is the use of multiple sensor circuits, one for each bus. This technique reduces the chance that a latent failure in one of the sensor circuits will prevent all of the buses from being disabled at once. Failures in the sensor circuits can manifest themselves as failures to detect changes in voltages. However, even if one of the sensor circuits is affected by a malfunctioning processor and does not fence off the malfunctioning processor from a particular bus, the other processors will still be able to communicate on one of the other buses from which the malfunctioning bus is fenced.

The structure of the sensor circuit of the present invention includes multiple sets of comparators wherein each set has one comparator for each voltage supplied by the power supply. The number of sets of comparators is determined by the number of buses which require a fencing circuit. The comparators are responsible for detecting a change in the supply voltages and if any one of those voltages changes by a predetermined threshold value, the comparator causes the connected fence to be raised.

Another advantage of the present invention is that it allows each fence circuit to be activated by a separate sensor circuit. This technique allows each bus to be fenced independently. Therefore, if one sensor circuit is malfunctioning it does not necessarily mean that all of the buses will be affected.

For a further understanding of the nature and advantages of the present invention, reference should be made to the remaining portion of the specification and the attached drawings.

DESCRIPTION OF THE PREFERRED EMBODIMENT

Figure 1:
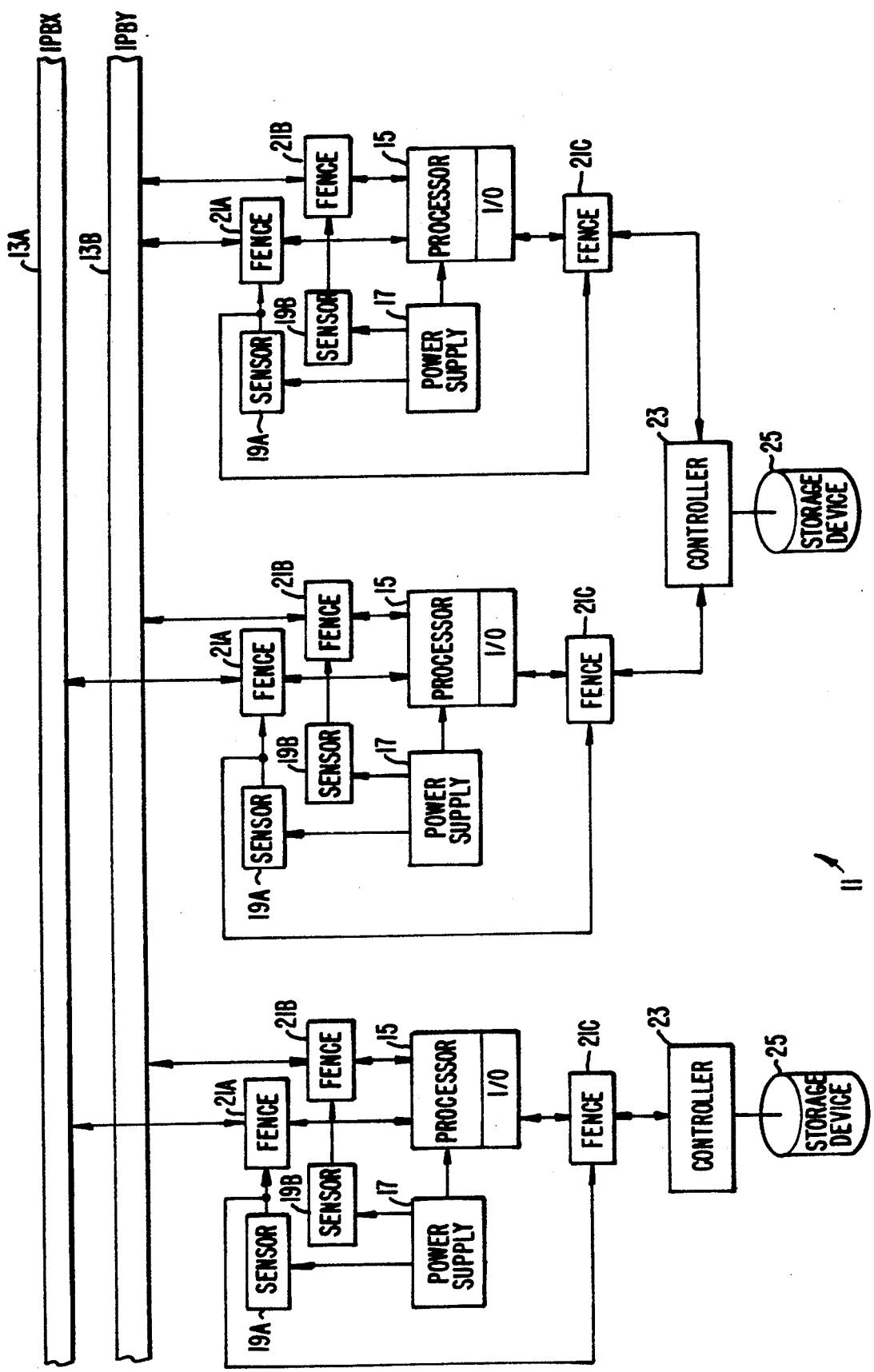
FIG. 1 is a block diagram of a multiprocessor system including multiple processors each having a power supply with associated sensor circuits and fencing circuits

Referring to FIG. 1, a multiprocessor system 11 is shown which has a pair of interprocessor buses. The interprocessor buses are labelled IPBX 13A and IPBY 13B. These buses 13 connect together a group of processors 15 so that processors 15 can communicate with each other. Each processor 15 has its own power supply 17. Connected to each power supply 17 is a set of sensor circuits 19. These sensor circuits 19 monitor the voltages coming from power supply 17.

Each sensor circuit 19 is connected between power supply 17 and a fencing circuit 21. Fencing circuit 21 is used to fence processor 11 from bus 13 or controller 23. As can be seen from FIG. 1, more than one processor 15 can be connected to a single controller 23 and storage device 25. Controller 23 is used to interface and control the transfer of information between processor 15 and storage device 25.

Figure 2:
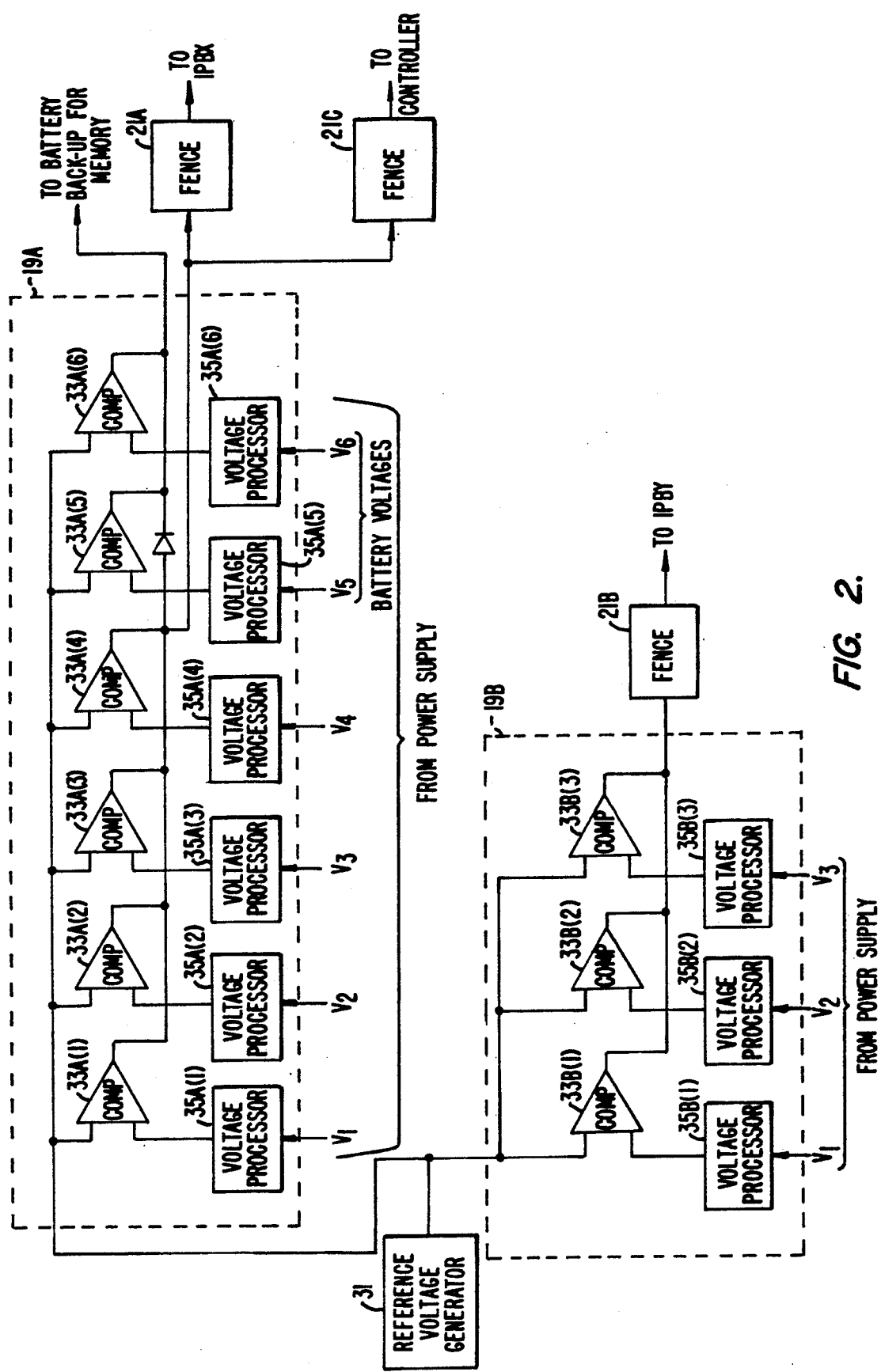
FIG. 2 is a block diagram of a group of sensor circuits for activating fencing circuits.

FIG. 2 shows a more detailed block diagram of sensor circuits 19. Each sensor circuit comprises a number of comparators 33 corresponding to the number of voltages being monitored. Each comparator receives at a first input a reference voltage from a common reference voltage generator 31 and at a second input a processed version of the voltage being monitored by that comparator. The processed voltages are generated by respective voltage processors 35 which scale the monitored voltages to bring them to the nominal reference level. The comparators have their outputs tied to a common line that input to the fencing circuit controlled by that sensor circuit.

Comparators 33A(5), 33A(6) are used for the purpose of signalling the backup battery supply to take over supplying power to the memories. In the case that power supply 17 is malfunctioning, the information stored in memory (not shown) will need to be saved. Therefore, when sensor circuit 19A detects a power failure on any of the supplied voltages, the processor machine state is saved in the memory, the memory is put into an idle mode and the memory is powered from the backup battery supply.

The operation of sensor circuits 19 will now be explained with reference to FIGS. 1 and 2. If power supply 17 experiences a failure, at least one of the supplied voltages will be affected. Voltage processor 35 will process the supply voltage and it will be input to comparator 33. Comparator 33 will compare the affected voltage to the reference voltage and if the affected voltage is different from its proper level by more than a predetermined threshold value, comparator 33 will signal fencing circuit 21 to disconnect processor 15 from bus 13 or controller 23.

In the case that one of comparators 33 within sensor circuit 19A does not function properly to disconnect processor 15 from bus 13A, information on bus 13A may be corrupted and bus 13A would be unavailable for proper use by the system. For example, if voltage V2 falls below its proper level by more than the predetermined threshold value but is still high enough to power the system's logic, it will continue to be input to voltage processors 35A(2), 35B(2) 35C(2) and then on to comparators 33A(2), 33B(2), 33C(2). Assuming that comparator 33A(2) does not function properly to signal fence circuit 21A to disconnect processor 15 from bus 13A, information on bus 13A may be corrupted and bus 13A rendered unusable if the driver logic is not operating correctly due to insufficient supply voltage.

However, at the same time, comparator 33B(2) would recognize the fallen V2 voltage and signal fencing circuits 21B to disconnect processor 15 from bus 13B. Therefore, bus 13B and controller 23 would still be functioning properly and available for continued use by the system even though bus 13A is unusable.

In FIG. 1, one of the controllers 23 is connected to two processors. Therefore, if one of the processors connected to that controller fails, the controller must be fenced from the malfunctioning controller. This is done through fence 21C which is connected to sensor 19A. However, if sensor 19A fails, the other processor 15 connected to the controller can issue a signal to the controller causing that controller to exclusively communicate with the properly functioning processor.

Each of comparators 33 functions as described above. Therefore, if any of the voltages supplied by power supply 17 changes by more than the predetermined threshold value, fencing circuit 21 would be caused to disconnect corresponding processor 15 from bus 13. In addition, in the case where fencing circuit 21 is connected between processor 15 and controller 23, processor 15 would be disconnected from controller 23.

Figure 3:
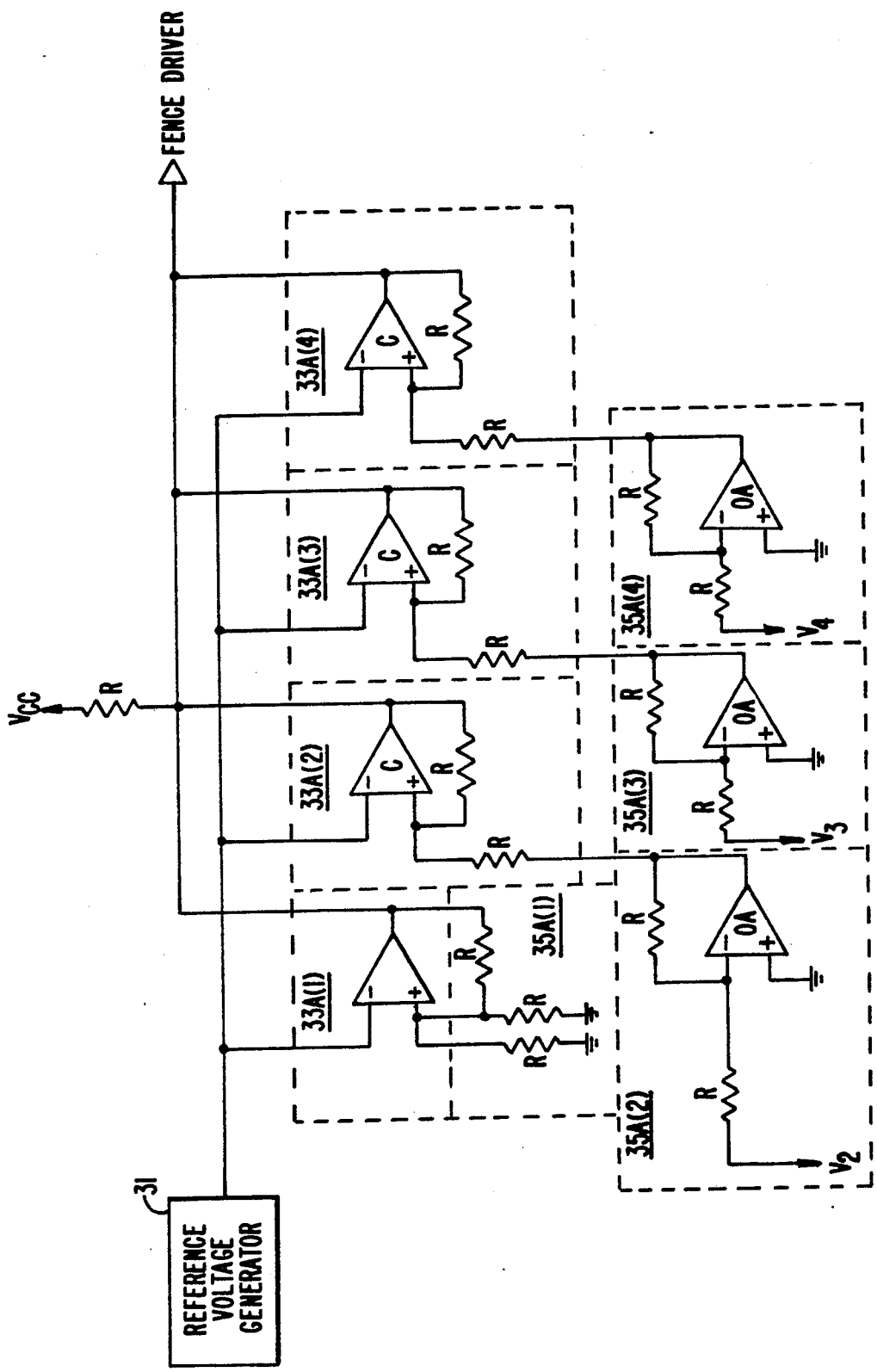
FIG. 3 is a schematic of the sensor circuits of FIGS. 1 and 2.

FIG. 3 is a schematic diagram of comparator 33 and voltage processor 35 shown in FIGS. 1 and 2. Various resistors are designated by R. operational amplifiers are designated by OA, and comparators are designated C. Basically, the voltage processors 35 transform each voltage into a nominal standard voltage. The nominal standard voltage is then applied to the positive input of comparator C of comparator 33. If the voltage drops below a certain level, a signal is sent out on the output of comparator C triggering fence 21. In the case of a negative source voltage, an operational amplifier OA is used in voltage processor 35 (35A(2), 35A(3), 35A(4)) along with a group of resistors R. In the case of a positive voltage source, a simple resistor network made up of resistors R is used for voltage processor 35 (35A(1)).

Figure 4:
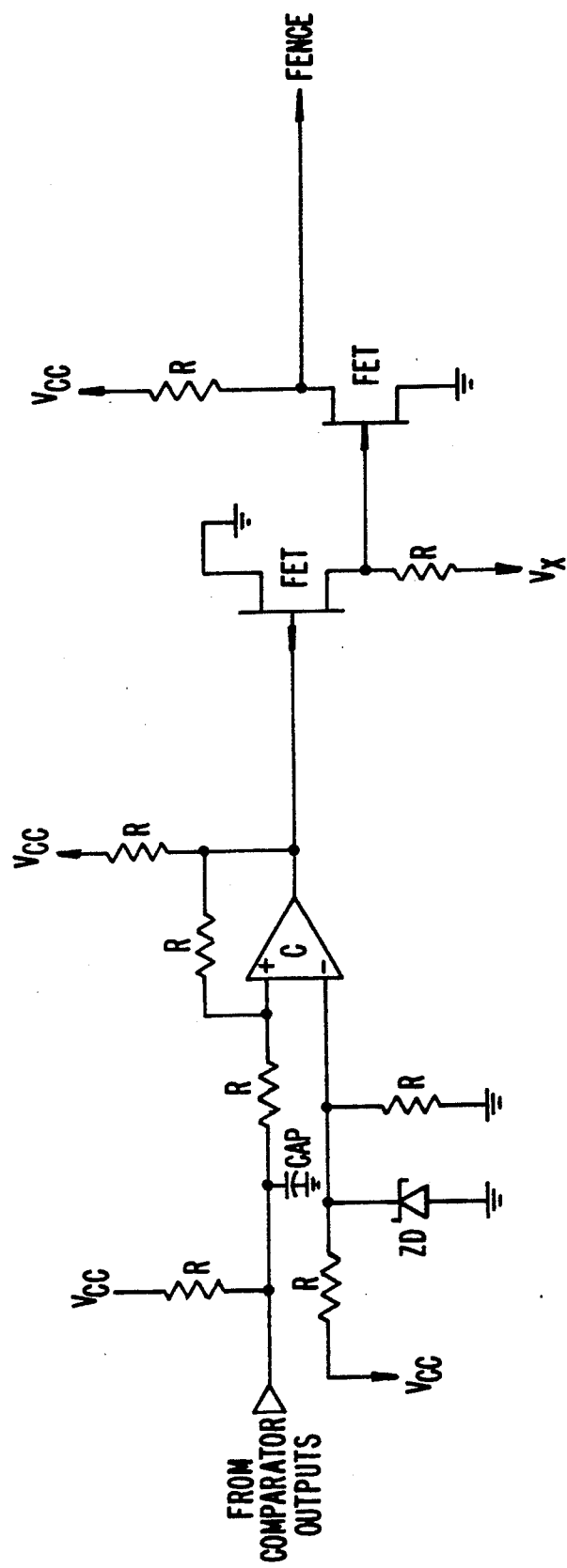
FIG. 4 is a schematic of the driver circuit used to activate the fences in case of a malfunction.

FIG. 4 is a schematic diagram of the driver circuit for fences 21. As in FIG. 3, resistors are designated by R, comparators are designated C, zener diodes are designated ZD, field affect transistors are designated FET, and various voltages are designated V.

The driver circuit includes a comparator C which compares the incoming voltage from comparators 35 to a reference voltage. When a malfunction occurs, the comparator detects the change in voltage and causes the FET's to activate fence 21. The combination of resistor, R (from Vcc to the comparator outputs), and capacitor, Cap, provide delay to permit the processor to be fully reset before it commences operation.

The invention as described provides a set of sensor circuits which will isolate a malfunctioning processor from the rest of a properly operating multiprocessor system. Even if one of the sensor circuits is not operating properly due to power supply failure, it is most probable that the processor will be disconnected from at least one of the redundant system buses. This being the case, the system can still manage to operate properly without the use of the malfunctioning processor and a corrupted bus.

In general, to those skilled in the art to which this invention relates, many changes in construction and widely differing embodiments and applications of the present invention will suggest themselves without departing from its spirit and scope. Thus, the disclosures and descriptions herein are purely illustrative and are not intended to be in any sense limiting.

What is claimed is:

1. A power supply failure detection apparatus for preventing an individual malfunctioning processor unit from causing an entire multi-processor system, having a plurality of individual processor units of which the malfunctioning processor is one, to experience a total failure, wherein each processor in the system has its own power supply which provides a set of N voltages and the system is interconnected for parallel processing by a plurality of interprocessor buses, comprising:

a reference voltage generator for supplying a reference voltage;

a first sensor circuit, responsive to a first subset, N1, of said N voltages with N1 being less than or equal to N, indicating that at least one of said first subset of voltages has changed by more than a predetermined threshold value, including, a first plurality of N1 voltage processors each one for converting one of the first subset of voltages to a nominally standard voltage.

a first plurality of N1 comparators, each having a first input connected to receive the reference voltage from the reference voltage generator, and a second input connected to receive the nominally standard voltage from a respective one of said first plurality of voltage processors, and a first output line connected to the output of each of the first plurality of N1 comparators for carrying a first fence-off signal from the first plurality of N1 comparators when the nominally standard voltage and the reference voltage differ by more than the predetermined threshold value:

a first fence connected to the first output line and a first one of the interprocessor buses for disconnecting the malfunctioning processor from the first one of the interprocessor buses when the first fence-off signal is received:

a second sensor circuit responsive to a second subset, N2 of said N voltages with N2 being less than or equal to N, indicating that at least one of said second subset of voltages has changed by more than the predetermined threshold value, including, a second plurality of N2 voltage processors, each one for converting one of the second subset of voltages to a nominally standard voltage.

a second plurality of N2 comparators, each having a first input connected to receive the reference voltage from the reference voltage generator, and a second input connected to receive the nominally standard voltage from a respective one of said second plurality of voltage processors, and a second output line connected to the output of each of the second plurality of N2 comparators for carrying a second fence-off signal from the second plurality of N2 comparators when the nominally standard voltage and the reference voltage differ by more than the predetermined threshold value: and a second fence connected to the second output line and a second one of the interprocessor buses for disconnecting the malfunctioning processor from the second one of the interprocessor buses.

2. The system of claim 1, further comprising:

a third output line connected to the first output line for carrying a third fence-off signal when the nominally standard voltage and the reference voltage differ by more than the predetermined threshold value: and a third fence connected to the first output line and an input/output interface line for disconnecting the malfunctioning processor from the input/output interface line.

3. The system of claim 1, further comprising:

a third sensor circuit responsive to a third subset, M1 of a group of M battery voltages with M1 being less than or equal to N, and said N voltages indicating that at least one of said third subset or one of said N voltages has changed by more than the predetermined threshold value, including.

a third plurality of M1 voltage processors, each one for converting one of the third subset of voltages to a nominally standard voltage.

a third plurality of M1 comparators, each having a first input connected to receive the reference voltage from the reference voltage generator, and a second input connected to receive a respective one of said third plurality of voltage processors, and a third output line connected to the output of each of the third plurality of M1 comparators and the output of each of the first plurality of N1 comparators for carrying a battery fence-off signal from the third and first pluralities of M1 and N1 comparators when the standard voltage and the reference voltage differ by more than the predetermined threshold value: and a memory switch connected to the third output line, a memory, and a backup battery supply for connecting the memory to the backup battery supply.

* * * * *